United States Patent
Srour et al.

(10) Patent No.: US 10,542,103 B2
(45) Date of Patent: Jan. 21, 2020

(54) LOCATION BASED MULTI-DEVICE COMMUNICATION

(71) Applicant: Microsoft Technology Licensing, LLC, Redmond, WA (US)

(72) Inventors: Orr Srour, Ramat-Hasharon (IL); Amir Zyskind, Tel Aviv (IL); Uri Ron, Kfar Saba (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 351 days.

(21) Appl. No.: 15/262,879

(22) Filed: Sep. 12, 2016

(65) Prior Publication Data

US 2018/0077248 A1    Mar. 15, 2018

(51) Int. Cl.
| | |
|---|---|
| G06F 15/16 | (2006.01) |
| H04L 29/08 | (2006.01) |
| H04W 4/029 | (2018.01) |
| H04L 29/06 | (2006.01) |
| H04W 84/12 | (2009.01) |
| H04W 4/80 | (2018.01) |

(52) U.S. Cl.
CPC ............. *H04L 67/18* (2013.01); *H04W 4/029* (2018.02); *H04L 67/02* (2013.01); *H04L 67/10* (2013.01); *H04L 67/42* (2013.01); *H04W 4/80* (2018.02); *H04W 84/12* (2013.01)

(58) Field of Classification Search
CPC .......... H04L 67/18; H04L 67/02; H04N 4/02; H04N 4/80
USPC ........................................................ 709/217
See application file for complete search history.

(56) References Cited

U.S. PATENT DOCUMENTS

| | | | |
|---|---|---|---|
| 8,924,858 B2 | 12/2014 | Mistry et al. | |
| 8,984,153 B2 | 3/2015 | Evans et al. | |
| 10,019,591 B1* | 7/2018 | Beguin | ............... G06F 21/6218 |
| 2007/0239981 A1 | 10/2007 | Lessing | |
| 2012/0096368 A1 | 4/2012 | McDowell | |
| 2013/0201123 A1 | 8/2013 | Jung et al. | |

(Continued)

OTHER PUBLICATIONS

"Apple previews major update with macOS Sierra", Published on: Jun. 13, 2016 Available at: http://www.apple.com/newsroom/2016/06/apple-previews-major-update-with-macos-sierra.html.

*Primary Examiner* — Alan S Chou
(74) *Attorney, Agent, or Firm* — Arent Fox LLP

(57) ABSTRACT

The disclosure is related to context driven interactions between a host computing device having a digitized surface and a client device. During a touch interaction, the host computing device detects a touch on the digitized surface and receives a client identifier from the client device. In an implementation, the host computing device may respond to a touch interaction in a context driven manner. The host computing device may determine an event based on a context of the touch interaction. The context may include, for example, the location (e.g., coordinates) of the touch, the client identifier received during the touch interaction, and an active application on the host computing device during the touch interaction. Based on the determined event, the host computing device may request specific information regarding the client device. The specific information may be selected by the host computing device based on the determined event.

20 Claims, 8 Drawing Sheets

(56) References Cited

U.S. PATENT DOCUMENTS

| | | | |
|---|---|---|---|
| 2013/0238744 A1* | 9/2013 | Paschke | G06F 9/543 |
| | | | 709/216 |
| 2013/0346491 A1 | 12/2013 | Margolin | |
| 2014/0040762 A1 | 2/2014 | Kusher et al. | |
| 2014/0113550 A1 | 4/2014 | Li | |
| 2014/0123038 A1* | 5/2014 | Ahn | G06F 3/0488 |
| | | | 715/761 |
| 2014/0267339 A1 | 9/2014 | Dowd et al. | |
| 2014/0289201 A1 | 9/2014 | Chan et al. | |
| 2014/0292720 A1 | 10/2014 | Liang | |
| 2014/0351434 A1 | 11/2014 | Kim et al. | |
| 2014/0359140 A1* | 12/2014 | Shankarraman | H04L 65/1069 |
| | | | 709/227 |
| 2016/0196060 A1* | 7/2016 | Walline | G06F 3/017 |
| | | | 715/773 |

\* cited by examiner

LOCATION BASED MULTI-DEVICE COMMUNICATION

BACKGROUND

Computing devices are known to include a digitized surface such as a touch screen. A user of such a computing device may interact with the digitized surface using a finger or a stylus. For example, the user may touch the digitized surface to select one or more objects, issue commands, or draw on the digitized surface. For example, a digitized surface may be used to select content for a copy and paste feature. Similar interactions may be performed on a second computing device.

While such copy and paste interactions are useful in some scenarios, such approaches are user driven. That is, the user manually interacts with the both devices to select the data for transfer. Accordingly, there is a need for more intuitive interactions for interacting with a computing device.

SUMMARY

The following presents a simplified summary of one or more aspects in order to provide a basic understanding of such aspects. This summary is not an extensive overview of all contemplated implementations, and is intended to neither identify key or critical elements of all aspects nor delineate the scope of any or all aspects. Its sole purpose is to present some concepts of one or more aspects in a simplified form as a prelude to the more detailed description that is presented later.

In an implementation, the disclosure provides a method for context based interactions for a host computing device. The method may include detecting, at the host computing device, a local signal from a client device, the local signal being associated with a physical location on a digitized surface of the host computing device. The method may also include determining the physical location on the digitized surface based on the local signal. The method may also include receiving, at the host computing device, an identifier of the client device. The method may further include determining an event based on an active application on the host computing device, the identifier, and the physical location. The method may also include requesting a specific type of information related to the client device, wherein the specific type of information is selected by the host computing device based on the event.

In another implementation, the disclosure provides a computing device for context based interactions. The computing device includes a digitized surface that detects a local signal from a client device, the local signal being associated with a physical location on the digitized surface. The computing device may also include a memory and a processor communicatively coupled to the memory and the digitized surface. The processor may be configured to determine the physical location on the digitized surface based on the local signal. The processor may be configured to receive, at the computing device, an identifier of the client device. The processor may be configured to determine an event based on an active application on the computing device, the identifier, and the physical location. The processor may be configured to request a specific type of information related to the client device, wherein the specific type of information is selected by the computing device based on the event.

In yet another implementation, the disclosure provides a non-transitory computer readable medium storing computer executable instructions for context based interactions. The non-transitory computer readable medium may include instructions to detect, at a host computing device, a local signal from a client device, the local signal being associated with a physical location on a digitized surface of the host computing device. The non-transitory computer readable medium may include instructions to determine the physical location on the digitized surface based on the local signal. The non-transitory computer readable medium may include instructions to receive, at the host computing device, an identifier of the client device. The non-transitory computer readable medium may include instructions to determine an event based on an active application on the host computing device, the identifier, and the physical location. The non-transitory computer readable medium may include instructions to request a specific type of information related to the client device, wherein the specific type of information is selected by the host computing device based on the event.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
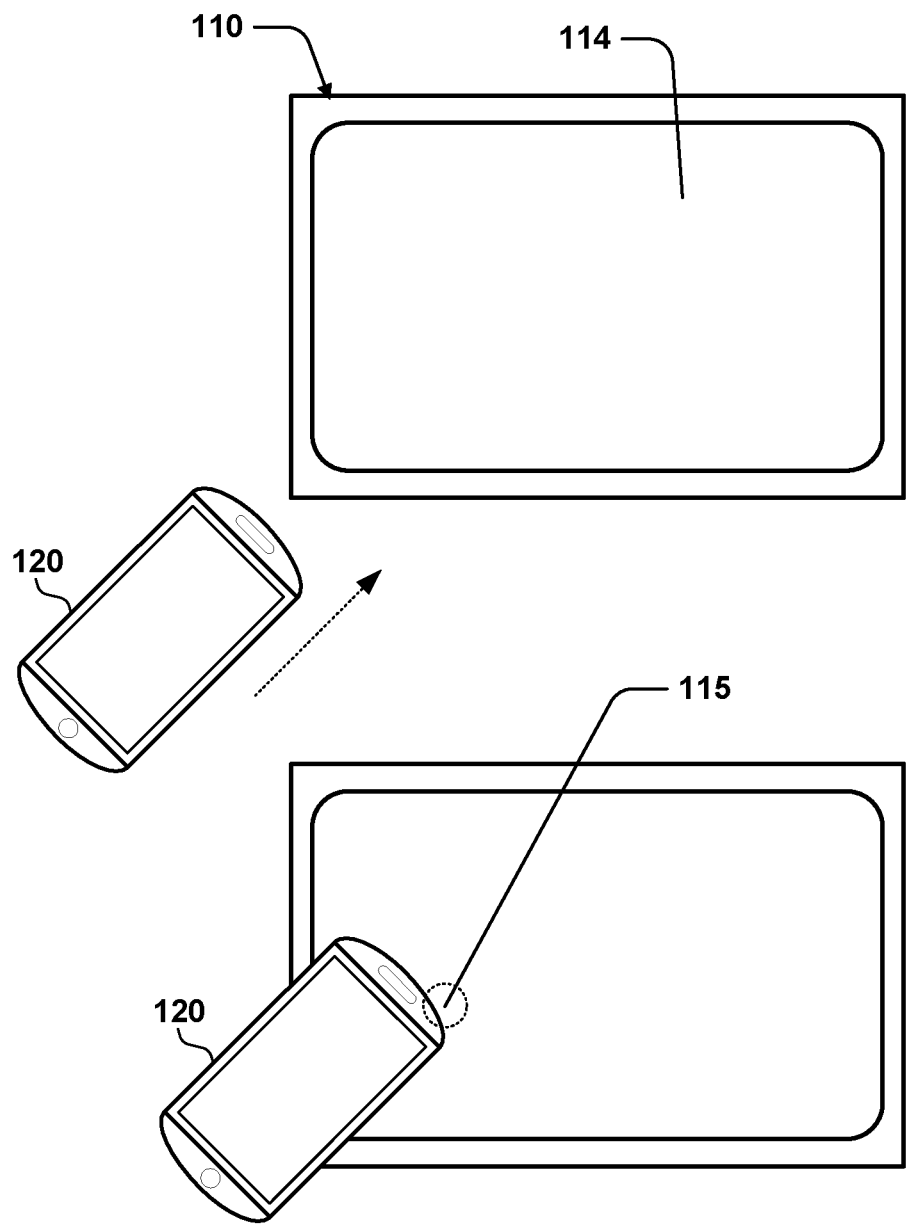
FIG. 1 is a diagram showing an example of a client device engaging in a touch interaction with a host device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to context driven interactions between devices based on a digitized surface. The examples described herein may be implemented on one or more devices. As used herein, the term "host device", "host computing device", or simply "computing device" may refer to a device including a digitized surface and a short-range communication interface. In an implementation, the methods described herein are initiated when a client device "touches" the digitized surface of the host device. As used herein, the term "touch" may refer to any interaction that generates a location signal via the digitized surface. For example, a touch may include a physical touch upon a touch screen. As used herein, the term "client device" may refer to any device that is capable of communicating with the host computing device via a short range communication interface. In an implementation, a client identifier is transmitted from the client device to the host device at the time of the touch. While in some cases the client device may directly touch the host device, a touch may also include a finger or other object interacting with the digitized surface while the client device is within communication range of the short range communication interface. In another implementation, a touch may include detecting that the client device is within a proximity of a physical location on the digitized surface (e.g., hovering over the digitized surface). Accordingly, during a touch interaction, the host device may receive or determine the coordinates of the touch interaction via the digitized surface and receive the client identifier via the short range communication interface.

Various attempts have been made to provide for transfer of data between a first computing device and a second computing device based on touch interactions with a digitized surface. For example, some devices allow a copy and paste functionality where data is selected on a first device and copied to a shared clipboard. The copied data may then be transferred to a second device based on an interaction using the digitized surface of the second device. In one example, an identifier of a stylus used on the first device is associated with the copied data such that when the stylus is used on the second device, the identifier of the stylus can be used to retrieve the selected data from the clipboard. Such copy and paste functionality may require the user to manually select the objects to be copied from the first device and then manually specify a paste operation on the second device. In contrast, an implementation according to the present disclosure allows the host device to determine an event based on an active application on the host device, the identifier of the client device, and a physical location of the touch. The host device may then request a specific type of information related to the client device. The specific type of information may be selected by the computing device based on the event. Accordingly, the implementation may allow the host device to obtain information from the client device without the user manually selecting or inserting the information.

Additionally, multiple client devices may interact with a host device. In an implementation, the host device may perform the interactions sequentially. For example, the host device may be touched by a first client device, determine an event based on the context of the touch, and request information regarding the first client device. The host device may follow the same sequence when touched by a second client device. In another implementation, interactions with multiple devices may be interleaved and/or coordinated. For example, an event for responding to a particular first client device may include waiting for a touch from a second client device. The host device may wait for the touch from the second client device before completing the interaction with the first client device. It should also be appreciated that a device may act as a host computing device in one scenario and operate as a client device in another scenario. In an implementation, an interaction involving multiple devices may involve a first host device acting as a host device with a first client device. The first host device may then act as a client device with a second host device. For example, the first host device may obtain data (e.g., an image) when touched by the first client device. Then, the first host device (i.e., acting as a client device) may touch a second host device and transfer the image to the second host device.

FIG. 1 illustrates an example of a touch interaction between a host device 110 and a client device 120. The client device 120 may move toward the host device 110 and physically contact a digitized surface 114 of the host device 110 at a physical location 115. In this example, the digitized surface 114 may be a touch screen of the host device 110. In another example (not shown) the digitized surface 114 may be a touch pad or a printed surface having a digitizer to detect touches. In some examples, the host device 110 may detect the client device 120 hovering near the digitized surface 114 and register the touch event upon an action such as clicking a button on the client device 120. The host device 110 may respond to a touch interaction in a context driven manner.

The host device 110 may determine an event based on a context of the touch interaction. The context may include, for example, the location (e.g., coordinates) of the physical location 115 on the digitized surface 114, the client identifier received during the touch interaction, and an active application on the host device 110 during the touch interaction. The operating system may select (or configure) a software application as the active application. The active application may receive input from input devices (e.g., mouse or keyboard). The active application may be displayed on at least part of a display, which may be integrated with the digitized surface 114. In an implementation, an operating system may be the active application. Based on the determined event, the host device 110 may request specific information regarding the client device 120. The specific information may be selected by the host device 110 based on the determined event.

Turning now to FIGS. 2-7, examples are depicted with reference to one or more components and one or more methods that may perform the actions or operations described herein, where components and/or actions/operations in dashed line may be optional. Although the operations described below in FIGS. 4-7 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

Figure 2:
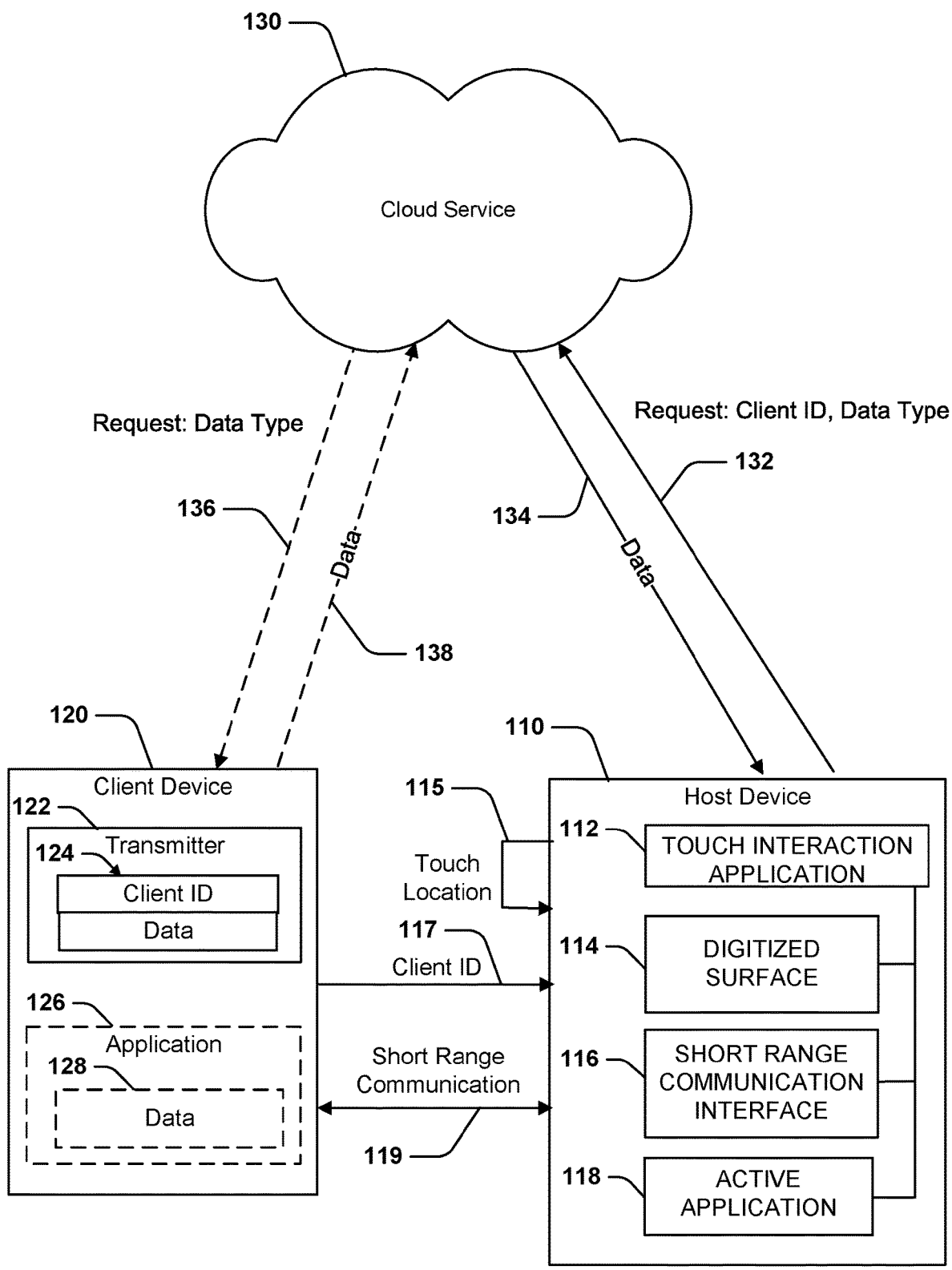
FIG. 2 is a schematic diagram of an example of a network for providing location based device context specific interactions.

FIG. 2 is a schematic diagram of an example of a network 100 for providing location based device context specific interactions. The network 100 includes a host device 110 and a client device 120 as shown in FIG. 1, and a cloud service 130. The host device 110 may be a computing device such as a laptop computer, tablet computer, mobile phone, personal digital assistant (PDA). The host device 110 may execute a touch interaction application 112 that provides for the location based device context specific interactions. Specifically, when the client device 120 touches the host device 110, the touch interaction application 112 may determine a context specific event and request information regarding the client device 120 corresponding to the context specific event. The information may be requested via the cloud service 130 or a direct short range communication with the client device 120.

The host device 110 may include a digitized surface 114 for determining a physical location 115. The digitized surface 114 may include any hardware for detecting an interaction between a surface of the host device 110 and a second object at a physical location on the digitized surface. In an implementation, the digitized surface 114 is a touch screen display. The touch screen display may be integrated with a display such that input locations of the digitized surface 114 correspond to output locations (e.g., pixels) of the display. In another implementation, the digitized surface 114 may include a touchpad. The digitized surface 114 may use resistive detection, surface acoustic wave detection, capacitive detection, optical or infrared detection, or any combination of detection techniques to determine a location of the touch interaction. In an implementation, the touch interaction may be generated by an active pen-like device that does not necessarily come into physical contact with the digitized surface 114. For example, the digitized surface 114 may detect the location of an active pen-like device hovering over the digitized surface and register a touch interaction when a button is pressed on the pen-like device. In another implementation, the digitized surface 114 may transmit signals that are detected by the client device 12. The client device may identify its location based on the signals and then transmit the location back to the host device.

The host device 110 may also include a short range communication interface 116 for receiving a client identifier (ID) 117 from the client device 120. The short range communication interface 116 may, in some implementations, be used for direct short range communication between the host device 110 and the client device 120. The short range communication interface 116 may include any hardware for short range wireless communications. For example, the short range communication interface 116 may use radio frequency (RF) technology. Active RF technology such as Bluetooth or Wi-Fi (IEEE 802.11) may be used. In another implementation, passive radio frequency identification (RFID) may be used, in which case the host device 110 may act as a reader and the client device 120 may include a passive RFID tag. Use of passive RFID may enable almost any object to be used as a client device. As another example, near field communication (NFC) may be used. NFC also enables use of passive tags that can be integrated into almost any object to be used as a client device 120. Additionally, the short range communication interface 116 may use optical signaling such as infrared signals or optical scanning (e.g., reading a printed barcode or quick response (QR) code). In an implementation, the short range communication interface 116 on the host device 110 reads at least the client ID 117 of the client device. As will be discussed in further detail below, depending on the event determined by the host device 110, the short range communication interface 116 may also transmit or receive additional information to or from the client device 120.

The client device 120 may be any object capable of communicating the client ID 117 to the host device 110 in association with a touch interaction. In an implementation, the client device 120 may be a computing device including a processor capable of transmitting data determined by the client device 120. In another implementation, the client device may not be a computing device (e.g., the client device 120 may not include a processor). For example, the client device 120 may include or may be part of an everyday object that has been associated with a short range communication tag. For example, a short range communication tag may be added to or may be part of a watch, bracelet, toy, eraser, key for a house or vehicle, container, or other object. The short range communication tag may be or include a transmitter 122. The transmitter 122 may include or be associated with a memory 124 that may permanently or temporarily store the client ID 117. In an implementation where the client device 120 is not a computing device (e.g., the client device 120 includes only a passive tag), information associated with the client device 120 may be stored in the memory 124 and/or by the cloud service 130. For example, the memory 124 may include properties of the client device 120 that may be configured when the short range communication tag is added to the client device 120. As another example, the cloud service 130 may store information associated with the client device 120 that is provided by the host device 110 or another computing device.

In some implementations, the client device 120 may also be a computing device including a processor and memory. The client device 120 may execute an application that generates or stores data 128. The client device 120 may communicate the data 128 to the host device, when requested, via either short range communication 119 or cloud service 130. In an implementation, the client device 120 may also provide metadata associated with a touch interaction. For example, the client device 120 may indicate a state of the device, for example, whether a button of the client device is pressed.

Cloud service 130 may be a network service that provides communications and/or storage services for the host device 110 and/or the client device 120. For example, the cloud service 130 may be implemented by a single computer server, a plurality of computer servers, a virtualized server, or any combination thereof. The cloud service 130 may be connected to the host device 110 and/or the client device 120 via a communications network that may involve one or more intermediate nodes. The cloud service 130 may store information regarding client devices in association with the client ID 117. The information stored by the cloud service 130 may be associated with particular data types. Accordingly, the host device 110 may transmit a request 132 including the client ID 117 and a requested data type, and the cloud service 130 may transmit a response 134 including data corresponding to the requested data type.

In an implementation, the cloud service 130 may store contact information for the client device 120. For example, the client device 120 may have an active connection to the cloud service 130 in the form of a session, socket, or other interface. The cloud service 130 may associate the client ID with the connection corresponding to the client device 120. When the cloud service 130 receives the request 132, the cloud service 130 may transmit a second request 136 to the client device 120. The second request 136 may include the data type from the request 132. In an implementation, the cloud service 130 may provide security by ensuring that the host device 110 is allowed to access the client device 120 (e.g., via control groups). In another implementation, the cloud service 130 may include a host device identifier in the second request 136 so that the client device 120 may determine whether to provide the requested data. The client device 120 may transmit a response 138 including the requested data.

Figure 3:
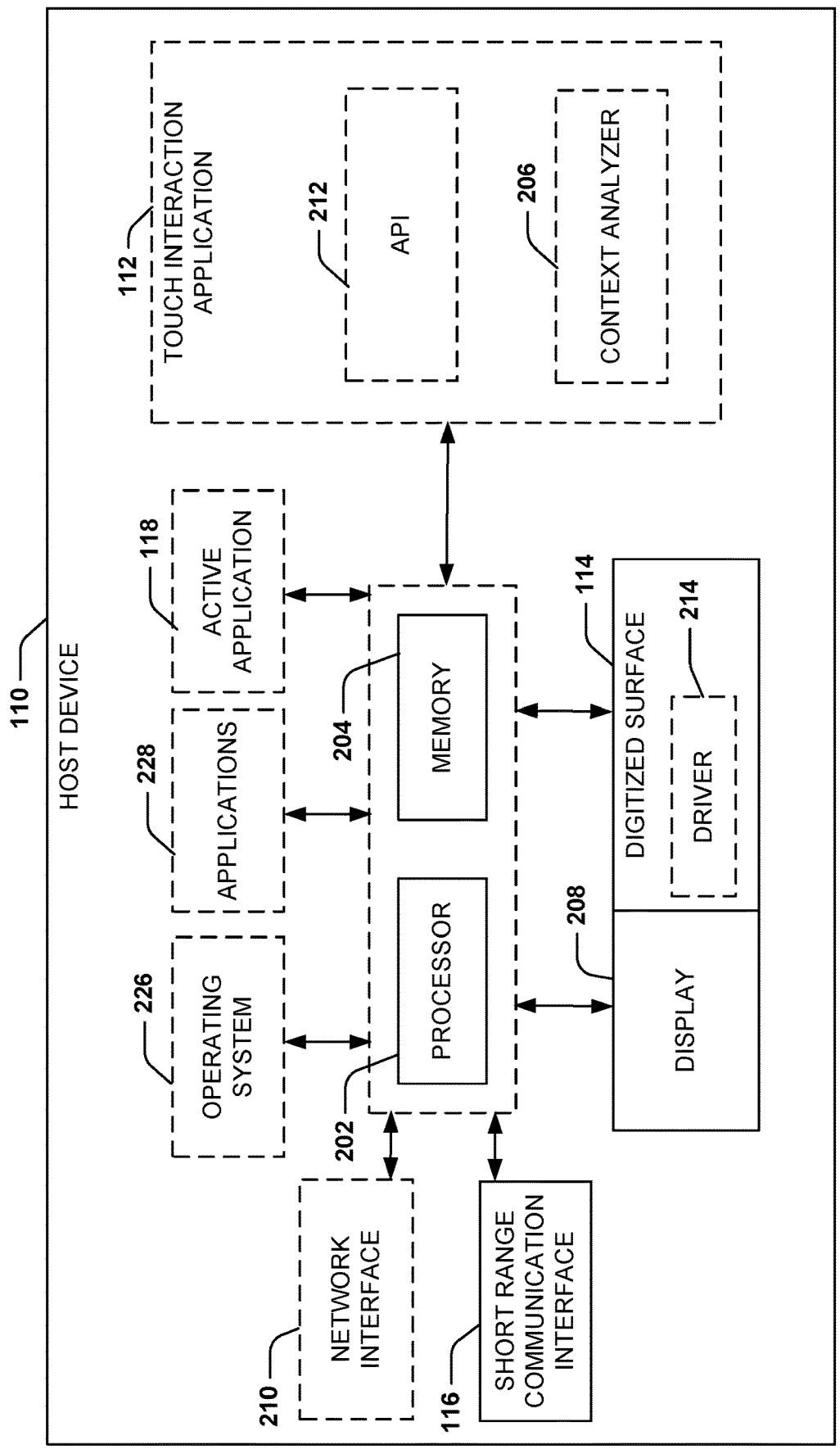
FIG. 3 is a schematic diagram of an example of a host computing device for providing location based device context specific interactions.

FIG. 3 is a schematic diagram showing further details of an example of the host device 110 for providing location based device context specific interactions. The host device 110 may be a computing device including a processor 202 communicatively coupled to a memory 204. The processor 202 and the memory 204 may execute an operating system 226 of the host device 110 as well as one or more applications 228. The host device 110 may further include the digitized surface 114 for detecting location specific touch interactions. The host device 110 may also include a display 208 for displaying one more outputs of the host device 110. One of the outputs may be associated with an active application. For example, the active application may generate an output representing one or more areas that are associated with different functions. For example, output areas of an active application may include buttons, images, and empty fields for receiving input. In an implementation, the display 208 may be integrated with the digitized surface 114. The host device 110 may further include the short range communication interface 116 for direct communication with the client device 120 in association with the touch interaction. The host device 110 may also include a network interface 210 for communication with the cloud service 130. A context analyzer 206 may determine events based on the location of a touch interaction, an identifier of the client device, and a current active application.

In an example, processor 202 and/or memory 204 can be configured to execute the touch interaction application 112 for performing touch based interactions with a client device. For example, the touch interaction application 112 can control the digitized surface 114 to detect a local signal between a client device 120 and the host device 110 associated with a physical location on the host device 110. The touch interaction application 112 may receive the client ID 117 of the client device 120 from the short range communication interface 116. The touch interaction application 112 may then execute context analyzer 206 to determine an event based on an active application 118 on the host device 110, the identifier, and the physical location (e.g., physical location 115 in FIG. 1). The touch interaction application 112 may include an application programming interface (API) 212 for interacting with other applications 228, any of which may be the active application. For example, each of the other applications 228 may use the API 212 to identify context specific events associated with the respective application 228 and define requested data corresponding to the events when selected as the active application. The touch interaction application 112 may be executed as a background task and/or may be part of the operating system 226. In addition, the touch interaction application 112 can control network interface 210 and/or short range communication interface 116 to request a specific type of information related to the client device 120 based on the event.

In an implementation, the digitized surface 114 is associated with a driver 214. The driver 214 may include software stored in memory 204 and executed by processor 202. The driver 214 may convert hardware output signals from the digitized surface 114 into usable information. For example, the driver 214 may provide coordinates indicating the physical location 115 where the digitized surface 114 is contacted. The driver 214 may perform additional analysis of the touch. For example, the driver 214 may determine whether the touch includes a particular gesture. The driver 214 may also determine movement speed and other properties of the touch.

The display 208 may include any computer. As discussed above, the display 208 may be integrated with the digitized surface 114 such that the output locations of the display correspond to the input locations of the digitized surface 114. In an implementation, the display 208 may include one or more areas associated with an active application 228. The driver 214 may determine when a touch interaction is associated with an area of the active application.

The network interface 210 may include hardware, firmware, and/or software executable by a processor for network communications. The network interface 210, for example, may provide for wired or wireless communications with the cloud service 130 via one or more intermediate communication nodes. In an implementation, for example, the network interface 210 may share one or more hardware components (e.g., an RF transmitter) with the short range communication interface 116. For example, the short range communication interface 116 may establish a first wireless local area network (WLAN) with the client device 120, and the network interface 210 may establish a second WLAN with an access point or router that provides Internet access.

The processor 202 and memory 204 may also execute an operating system 226 and/or one or more applications 228 on the host device 110. The operating system 226 may be a software application that controls the operation of the host device 110. In an implementation, the operating system 226 controls the host device 110 to execute one or more additional applications 228. At any time, one of the operating system 226, a feature of the operating system 226, or the applications 228 may be considered the active application 118 for input and output operations. That is, while the active application 118 is shown as a separate component in FIG. 3, depending on a current context, the active application 118 may be either the operating system 226 or one of the applications 228. For example, when the user touches a start button or task bar of the operating system 226, the operating system may be considered the active application for purposes of determining an event. The operating system 226 may determine the active application 118 based on a current context, e.g., user selection. Generally, input via the digitized surface 114 is provided to the active application 118, and output from the active application 118 is displayed on at least a portion of the display 208.

Figure 4:
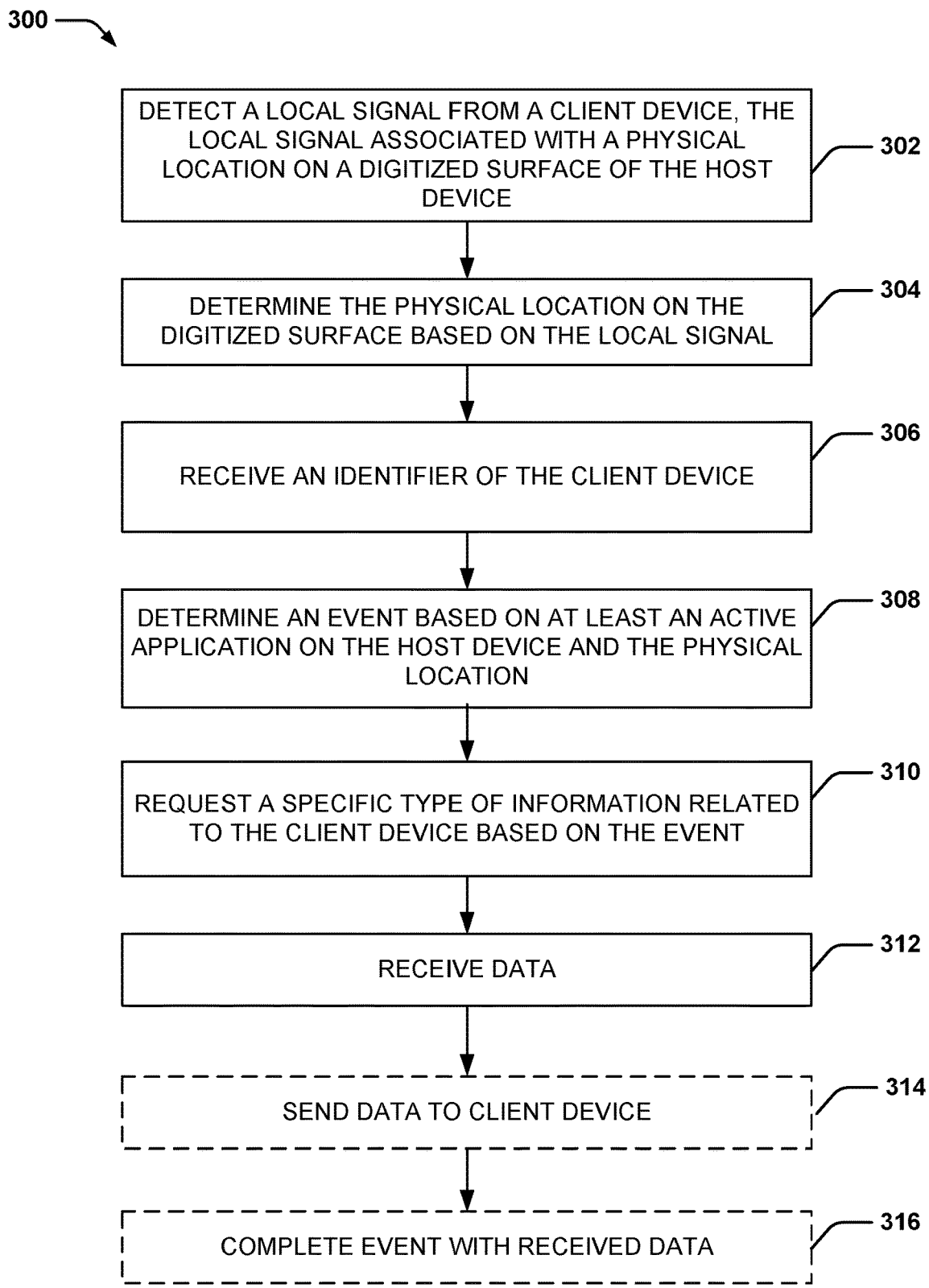
FIG. 4 is a flow diagram of an example of a method for responding to location based device context specific interactions.

FIG. 4 is a flowchart of an example of a method 300 for providing location based device context specific interactions. For example, method 300 can be performed by the host device 110 and/or one or more components thereof to respond to a touch by the client device 120.

In method 300, at action 302, the host device 110 may detect a local signal from a client device at the host device, the local signal associated with a physical location on the digitized surface of the host device. In an implementation, the digitized surface 114 may detect the local signal from the client device 120 at a physical location on the digitized surface 114. For example, the digitized surface 114 may determine that the client device 120 physically contacts the digitized surface 114. In an implementation, as discussed above, local signal may also include a proximity indication. For example, the digitized surface 114 may detect a local signal when the client device 120 hovers in close proximity above the digitized surface 114. The driver 214 may determine when such hovering qualifies as a touch (e.g., when a button is also pressed while hovering). It should also be appreciated that a touch may be detected when the client device 120 does not directly touch the digitized surface 114. For example, the digitized surface 114 may be contacted by a finger or stylus of the user while the client device 120 is within range of the short range communication interface 116.

At action 304, the method 300 may include determining the physical location on the digitized surface based on the local signal. In an implementation, the digitized surface 114 and/or the driver 214 may determine physical location on the digitized surface. The digitized surface 114 may generate signals (e.g., measurements from various sensors). The driver 214 may determine coordinates associated with the physical location on based on the signals from the digitized surface 114. For example, the coordinates may correspond to one or more pixels of the display 208.

In action 306, the method 300 may include receiving an identifier of the client device. In an implementation, for example, the short range communication interface 116 may receive the identifier of the client device. The touch interaction application 112 may control the short range communication interface 116 to request the client ID 117 in response to detecting the local signal. The touch interaction application 112 may infer that a client device 120 may be present when a touch interaction is detected by the digitized surface 114. In an implementation, the short range communication interface 116 may initiate a detection or discovery procedure according to a protocol associated with a technology of the short range communication interface 116. For example, if using RFID, the short range communication interface 116 may transmit an interrogating signal to any RFID tags within the operating range of the short range communication interface 116. Similarly, if using NFC, the short range communication interface 116 may initiate an NFC communication with any device within the operation range. If a client device 120 is within the operating range for RFID or NFC, the client device 120 may respond with the client ID 117. In another implementation where short range communication interface 116 utilizes optical or infrared scanning, the short range communication interface 116 may capture an image or scan of the area near the digitized surface 114 and then determine whether the captured image or scan includes a client ID 117. In yet another implementation, where the client device 120 utilizes active communication, the short range communication interface 116 may scan for active client devices 120, which may broadcast the client ID 117. In any case, the short range communication interface 116 may obtain the client ID 117 of the client device 120 that touched the digitized surface 114.

In action 308, the method 300 may include determining an event based on at least an active application on the host device and the physical location. In an implementation, for example, the context analyzer 206 may determine the event based on the active application on the host device and the physical location. Determining an event based on "at least" a set of factors does not exclude other factors from being considered when making the determination. For example, determining the event based on at least the active application on the host device and the physical location may also include determining the event based on at least the active application on the host device, the identifier of the client device, and the physical location. Determining an event may include determining that a transfer of data from the client device 120 to the host computing device 110 is to occur, the data being data displayed on the client device, and the transfer being to the active application 118 on the host computing device. In an implementation, the context analyzer 206 may determine a device type of the client device 120 based on the client identifier. The context analyzer 206 may also determine a function associated with the location within the active application. The context analyzer 206 may then determine an event associated with the type of client device and the function. In an implementation, the client device 120 may also provide metadata associated with a touch interaction. For example, the client device 120 may indicate a state of the device, for example, whether a button of the client device is pressed. The context analyzer 206 may also consider the state of the client device 120 as indicated by the metadata when determining the event. The context analyzer 206 may determine the event based on any combination of the active application on the host device, the location on the host device, the client device, the identifier of the client device, the type of the client device, the state of the client device, and a function associated with the location within the active application, as well as other factors.

In action 310, the method 300 may include requesting a specific type of information related to the client device based on the event. In an implementation, the context analyzer 206 may request the specific type of information related to the client device 120 via the short range communication interface 116 or via the network interface 210. The specific type of information may be defined by the event. For example, the event may be associated with an input function of the active application 118. The context analyzer 206 may determine the type of input for the input function and a corresponding type of data available with respect to the identified client device 120. The context analyzer 206 may then request the identified type of data by sending the request 132. In an implementation, the request may be transmitted directly to the client device via the short range communication interface 116. In another implementation, the request may be transmitted to the cloud service 130 via the network interface 210. The request may specify the requested data type.

In action 312, the method 300 may include receiving data in response to the request. In an implementation, for example, the network interface 210 or the short range communication interface 116 may receive the response 134 including the requested data in response to the request 132. For example, where the client device is a mobile phone, the physical location corresponds to a new tab button of a web browser application on the host computing device 110, and the specific type of information is a website, the host computing device 110 may receive a URL for a website displayed on the mobile phone.

In action 314, the method 300 may optionally include sending data to the client device. In an implementation, for example, the host device 110 may send data to the client device 120 via the network interface 210 or the short range communication interface 116. The data may be selected based on the event determined in action 308. Further, the information received in action 312 may include parameters for sending the data. For example, the response 134 may include output parameters of the client device 120 so that the host device 110 may format the data for output on the client device 120. In another example, if the client device 120 is a mobile phone or camera, the physical location corresponds to an input area of a document editor on the host computing device, and the specific type of information is an image, the host device 110 may receive an image file corresponding to an image displayed on the mobile phone or camera.

In action 316, the method 300 may optionally include completing the event with the received data. In an implementation, the active application 118 may complete the event with the received data. The active application 118 may use the received data as input into the previously selected field. For example, if the received data is a website or URL, the active application 118 may navigate to the website. As another example, if the receive data is a photograph, the active application 118 may insert the photograph into the current document at the location of the touch.

Figure 5:
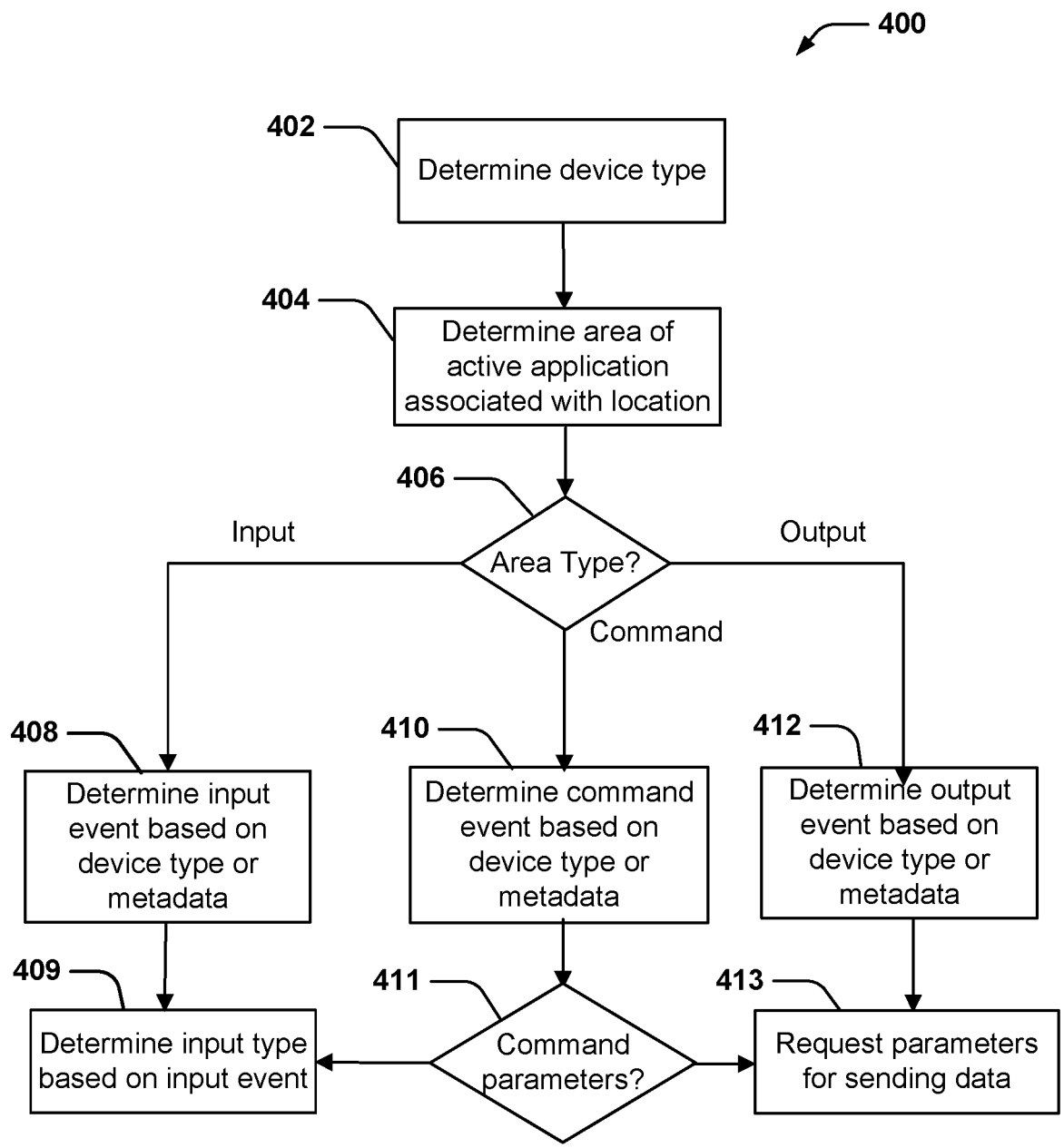
FIG. 5 is a flow diagram of an example of a method for determining an event based on a location, current application, and device identifier.

FIG. 5 illustrates an example of a flowchart showing a method 400 for determining an event based on an active application, a client identifier, and a physical location. For example, method 400 can be performed by the host device 110 and/or one or more components thereof. In an implementation, the method 400 may be an example of the action 308.

In action 402, the method 400 may include determining a device type based on the client identifier. In an implementation, for example, the context analyzer 206 may determine the device type based on the client identifier. In an implementation, the client identifier may include a coded portion identifying the device type. In another implementation, the context analyzer 206 may store device type information for previously encountered client identifiers. When an unknown client identifier is first encountered, the context analyzer 206 may query the cloud service 130 or the client device 120 for device type information. Determining a device type may also include determining capabilities of the client device 120. For example, if the device type is a computing device such as a smart phone, the context analyzer 206 may determine that the client device 120 may be capable of sending or receiving any data type. In contrast, for example if the device type is a simple tagged object, the context analyzer 206 may determine that the client device 120 may be capable of providing certain types of data but cannot receive any data types.

Action 404 of method 400 may include determining an area of the active application associated with the location. In an implementation, for example, the context analyzer 206 may determine the area of the active application 118 associated with the physical location 115. For example, the context analyzer 206 may compare the touch location coordinates with the display area for the active application 118. The context analyzer 206 may determine whether the touch location coordinates correspond to a particular area of the active application such as an input field, button, image, etc.

In action 406, the method 400 may include determining an area type of the area of the active application. In an implementation, for example, the context analyzer 206 may determine a type of the area of the active application. In an implementation, the active application 118 may provide an indication of the area selected, for example, via the API 212. The area types may correspond to functions of the area. In an example, the area types may be classified as one of input areas, output areas, or command areas. An input area, for example, may include any part of an application where text, images, or other information may be entered. An output area may include any part of an application that displays information. A command area may be an area of the active application 118 that triggers a particular event. The triggered event may be associated with either an input and/or an output. In an implementation, the function may also be based in part on metadata associated with the client device. For example, if the client device provides metadata indicating that a button was pressed, a touch associated with an input area may be interpreted as a command.

In action 408, in response to the area type being an input area, the method 400 may include determining an input event based on the device type and/or metadata. In an implementation, for example, the context analyzer 206 may determine the input event based on the device type. For example, if the input area is touched with a computing device, the input event may be transferring a current output of the client device 120 to the host device 110. As another example, if the client device 120 is a simple tagged object, the input event may be inserting information about the object. Accordingly, the determined input event may vary depending on which client device 120 touches the input area. Further, more specific input events may be determined for specific client devices 120 and specific input fields. For example, a touch interaction in a drawing field may generate a drawing input event when the client device 120 is an electronic pen, but generate a drawing control input event (e.g., for changing color or line width) when the client device 120 is a smart phone. In another implementation, the event may depend on both the device type and metadata transmitted by the client device 120. For example, the context analyzer 206 may determine a drawing input event for the electronic pen when no metadata is transmitted or the metadata indicates a neutral state, but determine an image paste event when the metadata indicates that a button of the electronic pen has been pressed.

In action 409, the method 400 may include determining an input type based on the input event. In an implementation, for example, the context analyzer 206 may determine the input type based on the input event. Example input types may include text, images, video, links, and other known data types. In another implementation, customized input types may be defined for particular input events. One or more of the applications 228 may use the API 212 to request specific information. For example, a drawing application on the host device 110 may request control information from a control application on the client device 120. The control information may include multiple pieces of information and may be received according to a defined format according to the API 212.

In action 410, in response to the area type being a command area, the method 400 may include determining a command event based on the device type and/or metadata. In an implementation, for example, the context analyzer 206 may determine the command event based on the command area and the device type. For example, a new tab button in a web browser may be considered a command area. When the new tab button is touched with a smart phone, the context analyzer 206 may determine that the command is to open a new tab for a webpage associated with the smart phone (e.g., a web page currently displayed on a browser of the smart phone). As another example, pressing a save button on any document editor with a smart phone or other client device 120 capable of storage may be considered a command to save the document to the client device 120. In contrast, when the save button is pressed by a client device 120 that is not capable of storing the document, the touch interaction may initiate a normal save command to save the document on the host device 110 in association with the client ID 117 (e.g., as metadata). In another implementation, if the save button is pressed by a client device 120 and the client device 120 provides metadata indicating that a button is pressed, the context analyzer may determine to send the document to the cloud service 130.

In action 411, the method 400 may include determining parameters for the command event. In particular, the parameters may be input our output parameters. If the command event requires input from the client device 120, the method 400 may proceed to action 409 where the command event may be treated as an input event. If the command event includes output to the client device 120, the method 400 may proceed to action 413 where the command event may be treated as an output event. In an implementation, the command may involve both input and output and include actions 409 and 413 concurrently or consecutively.

In action 412, in response to the area type being an output area, the method 400 may include determining an output event based on the client device and/or metadata. In an implementation, for example, the context analyzer 206 may determine the output event based on the client device. For example, the context analyzer 206 may determine the data currently displayed in the output area or other undisplayed data that is associated with the output area and determine whether the data is compatible with the client device 120 or whether other data is associated with the current data. For example, an output area may display an image but also be associated with a sound file. If the output area displaying the image is touched by a client device 120 including a display, the output event may be transferring the image to the client device 120. If the client device 120 does not include a screen, the output event may include transferring the associated data to the client device 120 or to the cloud service 130 for storage in association with the client ID. As another example, if the output area includes contact information such as a phone number and the client device 120 is a phone, the output event may be transferring the phone number for making a phone call.

In action 413, the method 400 may include requesting parameters for sending data. In an implementation, for example, the short range communication interface 116 or the network interface 210 may request parameters for sending data. In an example, the host device 110 may request permission to send the output data associated with the output event. The client device 120 and/or the cloud service 130 may consent to the request based on user input or defined rules. Other parameters for sending data may include a maximum size for the data, a transmission mechanism (e.g., direct communication via short range communication interface 16 or network communication via cloud service 130), file formats, or other properties specific to the data to be transferred.

Figure 6:
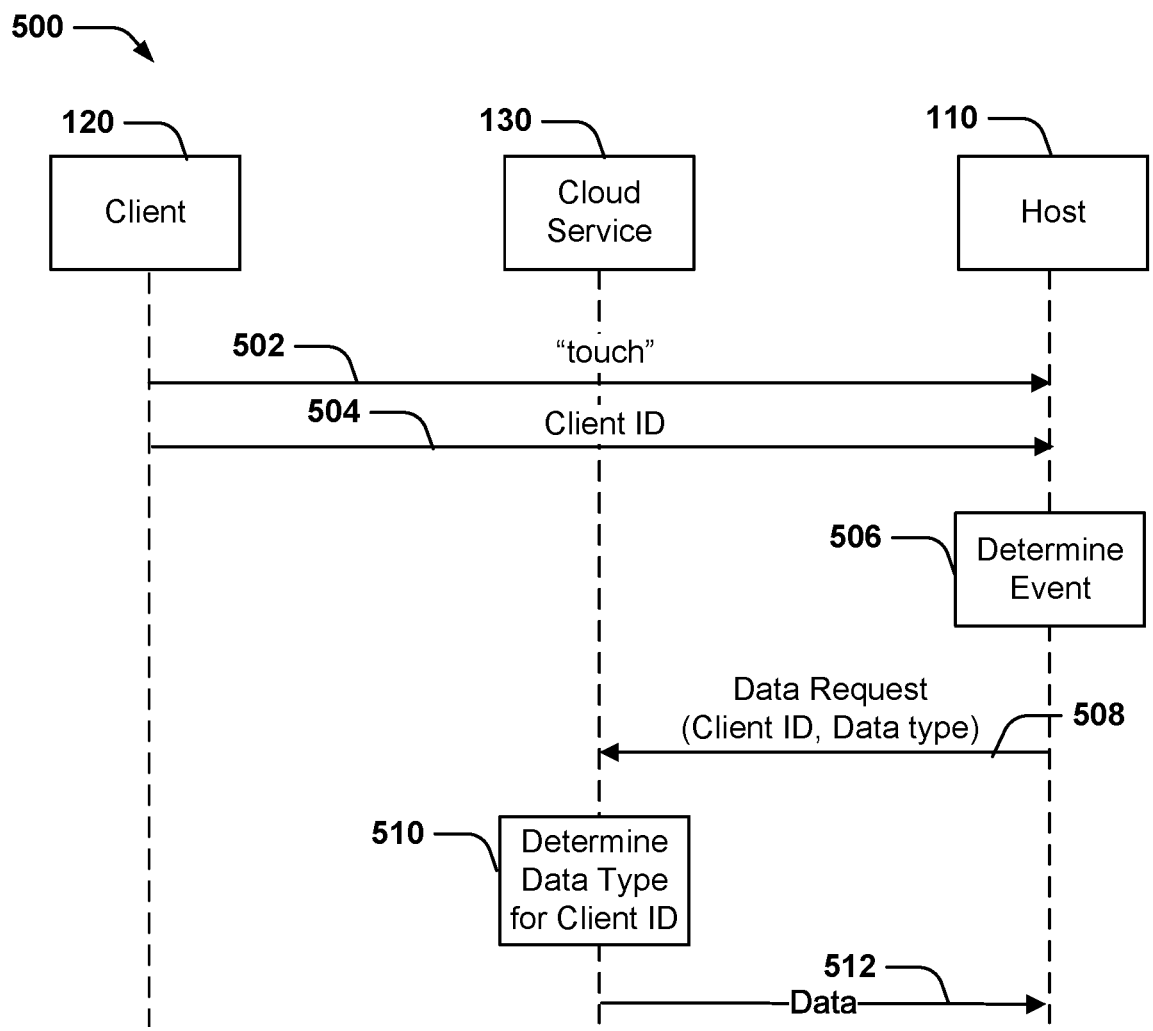
FIG. 6 is a message diagram of an example of a process for an interaction between a client device and a host device.

FIG. 6 is a message diagram 500 illustrating example messages for providing location based device context specific interactions between a host device 110 and a client device 120. In this example, the client device 120 may not have active communication abilities. For example, the client device 120 may include a passive RFID or NFC tag. In message 502, the client device 120 may touch the host device 110. As discussed above, the touch may include an indirect touch. The touch may be associated with a location on the host device. In message 504, the client device 120 may send a client ID (e.g., client ID 117) to the host device 110. At action 506, the host device 110 may determine an event. The event may be based on the location of the touch and the client ID as well as an active application on the host device 110. In message 508, the host device 110 may transmit a data request to the cloud service 130. The data request may include the client ID and a data type. The data type may be based on the determined event. In action 510, the cloud service 130 may determine data corresponding to the data type for the client ID. The data may be stored at the cloud service 130 in association with the client ID. For example, the stored information may include a website associated with the client device 120 such as a manufacturer website. As another example, the client device 120 may be a business card having a tag. The host device 110 may request contact information in response to touching a new contact button or initiating a new call or email using the business card. The cloud service 130 may determine the contact information corresponding to the business card. In message 512, the cloud service 130 may send the requested data to the host device 110.

Figure 7:
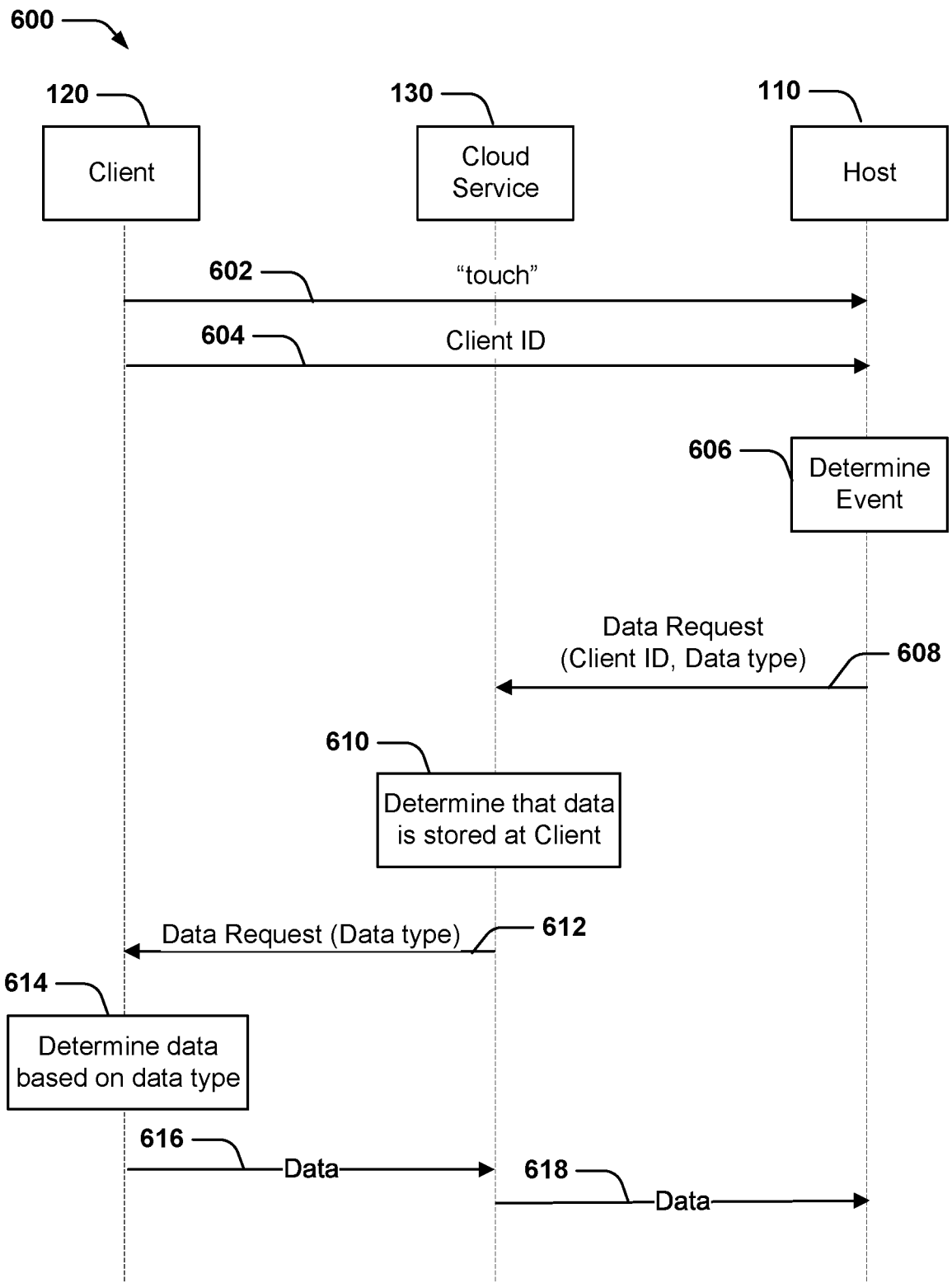
FIG. 7 is a message diagram of an example of a process for an interaction between a client device and a host device.

FIG. 7 is a message diagram 600 illustrating example messages for providing location based device context specific interactions between a host device 110 and a client device 120. In this example, the client device 120 may have active communication abilities. For example, the client device 120 may be a smart phone, smart watch, tablet computer, or other computing device. In message 602, the client device 120 may touch the host device 110. As discussed above, the touch may include an indirect touch. The touch may be associated with a location on the host device. In message 604, the client device 120 may send a client ID to the host device 110. At action 606, the host device 110 may determine an event. The event may be based on the location of the touch and the client ID as well as an active application on the host device 110. In message 608, the host device 110 may transmit a data request to the cloud service 130. The data request may include the client ID and a data type. The data type may be based on the determined event. In action 610, the cloud service 130 may determine that the requested data is not stored at the cloud service 130 and that the data is available from the client device 120. In message 612, the cloud service 130 may forward the data request to the client device 120. Message 612 may include the requested data type and may omit the client ID or substitute a network identifier associated with the client device 120 for the client ID. In action 614, the client device 120 may determine data based on the data type. For example, the client device 120 may determine data associated with a current application that satisfies the data type. For example, if the data type is a website (e.g. a URL), the client device 120 may determine a current or most recently visited website of a web browser. As another example, if the data type is associated with a particular application, the client device 120 may start the application to obtain the data. The data may include data input by or selected by the user. In message 616, the client device 120 may transmit the data to the cloud service 130 and in message 618, the cloud service 130 may transmit the data to the host device 110. In an implementation, the host device 110 may communicate directly with the client device 120. The messages 608 and 612 may be combined and the messages 616 and 618 may be combined when direct communication is used.

Figure 8:
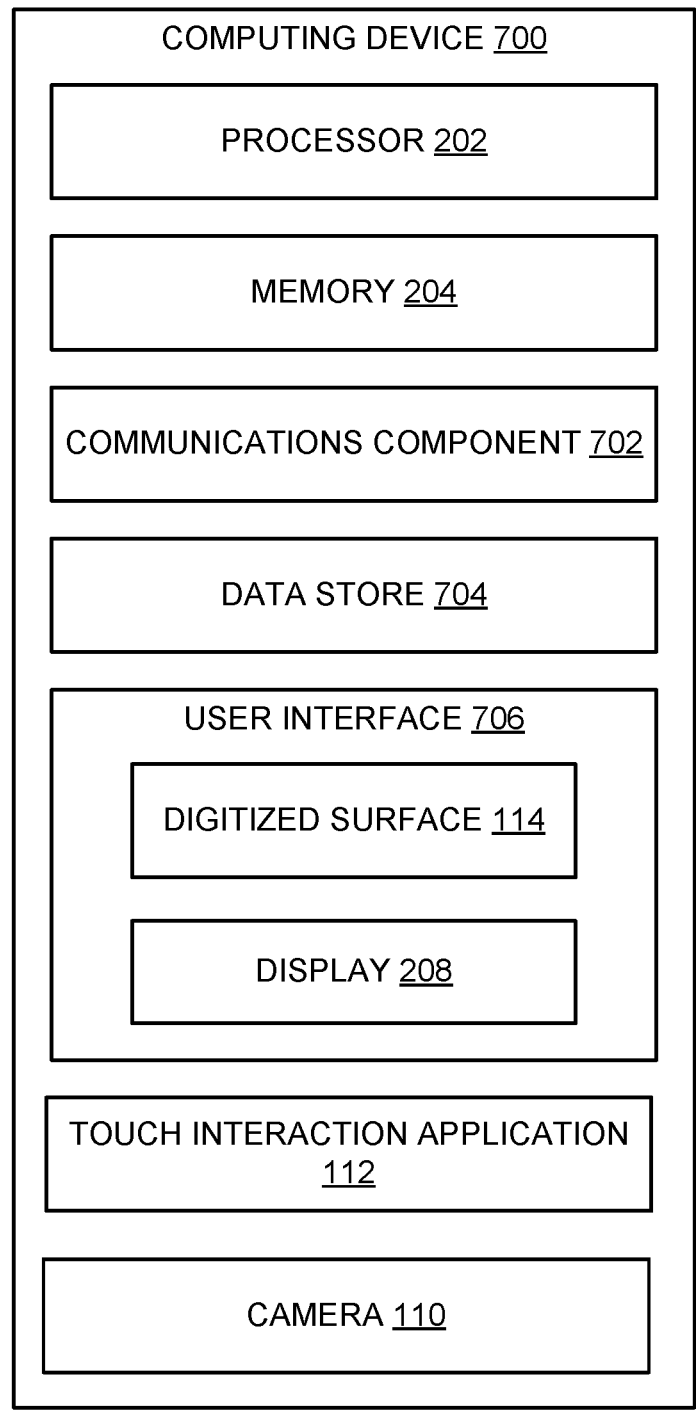
FIG. 8 is a schematic diagram of an example of a computing device for performing functions described herein.

FIG. 8 illustrates an example of a computing device 700, which may be an example of the host device 110. The computing device 700 may include additional optional component details as those shown in FIGS. 1 and 2. In one implementation, computing device 700 may include processor 202 for carrying out processing functions associated with one or more of components and functions described herein. Processor 202 can include a single or multiple set of processors or multi-core processors. Moreover, processor 202 can be implemented as an integrated processing system and/or a distributed processing system.

Computing device 700 may further include memory 204, such as for storing local versions of applications being executed by processor 202, related instructions, parameters, etc. Memory 204 can include a type of memory usable by a computer, such as random access memory (RAM), read only memory (ROM), tapes, magnetic discs, optical discs, volatile memory, non-volatile memory, and any combination thereof. Additionally, processor 202 and memory 204 may include and execute touch interaction application 112 and/or other components of the computing device 700.

Further, computing device 700 may include a communications component 702 that provides for establishing and maintaining communications with one or more other devices, parties, entities, etc. utilizing hardware, software, and services as described herein. Communications component 702 may carry communications between components on computing device 700, as well as between computing device 700 and external devices, such as devices located across a communications network and/or devices serially or locally connected to computing device 700. For example, communications component 702 may include one or more buses, and may further include transmit chain components and receive chain components associated with a wireless or wired transmitter and receiver, respectively, operable for interfacing with external devices.

Additionally, computing device 700 may include a data store 704, which can be any suitable combination of hardware and/or software, that provides for mass storage of information, databases, and programs employed in connection with aspects described herein. For example, data store 704 may be or may include a data repository for applications and/or related parameters (e.g., touch interaction application 112, applications 228, and operating system 226) not currently being executed by processor 202. In addition, data store 704 may be a data repository for touch interaction application 112 and/or one or more other components of the computing device 700.

Computing device 700 may also include a user interface component 706 operable to receive inputs from a user of computing device 700 (e.g., via digitized surface 114) and further operable to generate outputs for presentation to the user (e.g., via display 208). User interface component 706 may include one or more input devices, including but not limited to digitized surface 114, a keyboard, a number pad, a mouse, a touch-sensitive display, a navigation key, a function key, a microphone, a voice recognition component, a gesture recognition component, any other mechanism capable of receiving an input from a user, or any combination thereof. Further, user interface component 706 may include one or more output devices, including but not limited to a display interface to display 208, a speaker, a haptic feedback mechanism, a printer, any other mechanism capable of presenting an output to a user, or any combination thereof.

Computing device 700 may additionally include the touch interaction application 112, as described, for detecting a local signal between a client device and a host device associated with a physical location on the host device, determining the location on the host device, receiving, at the host device, an identifier of the client device, determining an event based on an active application on the host device, the identifier, and the physical location; selecting a specific information type based on the event, and requesting a specific type of information related to the client device. In addition, processor 202 can execute the touch interaction application 112, and memory 204 or data store 704 can store related instructions, parameters, etc., as described.

In one example, a computing device, includes a digitized surface that detects a local signal from a client device. The local signal may be associated with a physical location on the digitized surface. The computing device may also include a memory and a processor communicatively coupled to the memory and the digitized surface. The processor and the memory may be configured to determine the physical location on the digitized surface based on the local signal. The processor and the memory may be configured to determine the physical location on the digitized surface based on the local signal receive, at the computing device, an identifier of the client device. The processor and the memory may be configured to determine the physical location on the digitized surface based on the local signal. The processor and the memory may be configured to determine the physical location on the digitized surface based on the local signal determine an event based on at least an active application on the computing device and the physical location. The processor and the memory may be configured to determine the physical location on the digitized surface based on the local signal request a specific type of information related to the client device, wherein the specific type of information is selected by the computing device based on the event.

In an implementation, the processor and the memory are configured to determine a device type of the client device based on the identifier. The processor and memory may determine the event based on at least the active application, the physical location, and the device type.

In an implementation, the processor and the memory are configured to receive metadata from the client device indicating a state of the client device. The processor and the memory may be configured determine the event based on at least the active application, the physical location, and the state of the client device.

In an implementation, computing device includes a display integrated with the digitized surface. The processor and the memory may be configured to determine a device type of the client device based on the identifier. The processor and the memory may be configured to determine an area of the display associated with the active application and corresponding to the physical location. The processor and the memory may be configured to determine a function of the area associated with the active application. The processor and the memory may be configured to determine the event based on at least the function and the device type.

In an implementation, the computing device includes a short range wireless communication interface. The processor may receive the identifier of the client device directly from the client device via the short range wireless communication interface.

Additionally, the processor and memory may be configured to request the specific type of information related to the client device by transmitting a request for the information directly to the client device via the short range wireless communication interface. Also, the computing device may include a network interface different from the short range wireless communication interface. The processor and memory may be configured to request the specific type of information related to the client device by transmitting a request for the information to a service via the network interface. The request may include a requested data type.

In an implementation, the processor and memory are further configured to transmit information to the client device based on the event. In another implementation, the digitized surface is configured to detect the local signal from the client device when the client device is either in close proximity to or touching the physical location.

In an example, determining an event includes determining that a transfer of data from the client device to the host computing device is to occur. The data may be data displayed on the client device. The transfer may be a transfer to the active application on the host computing device.

In another example, the client device is a mobile phone, the physical location corresponds to a new tab button of a web browser application on the computing device, and the specific type of information is a website. The processor and the memory may be configured to receive, from the client device, a uniform resource locator for a website displayed on the mobile phone. The processor and the memory may be configured to open a new tab in the web browser application for the website.

In another example, the client device is a mobile phone or camera, the physical location corresponds to an input area of a document editor on the computing device, and the specific type of information is an image. The processor and the memory may be configured to receive an image file corresponding to an image displayed on the mobile phone or camera. The processor and the memory may be configured to insert the image file into the input area.

In another example, a method may include detecting, at the host computing device, a local signal from a client device, the local signal being associated with a physical location on a digitized surface of the host computing device. The method may also include determining the physical location on the digitized surface based on the local signal. The method may also include receiving, at the host computing device, an identifier of the client device. The method may further include determining an event based on at least an active application on the host computing device and the physical location. The method may also include requesting a specific type of information related to the client device, wherein the specific type of information is selected by the host computing device based on the event.

In an implementation of the method, determining the event based on at least the active application on the host computing device and the physical location includes: determining a device type of the client device based on the identifier; and determining the event based on at least the active application, the physical location, and the device type.

In another implementation, the digitized surface is integrated with a display of the host computing device. Determining the event based on at least the active application on the host computing device and the physical location may include: determining a device type of the client device based on the identifier; determining an area of the display associated with the active application and corresponding to the physical location; determining a function of the area associated with the active application; and determining the event based on at least the function and the device type.

In another implementation, the method may also include receiving metadata from the client device indicating a state of the client device. The method may also include determining the event based on at least the active application, the identifier, the physical location, and the state of the client device. In another implementation, the method may include sending information to the client device based on the event.

In an implementation of the method, detecting the local signal from the client device may include detecting a signal that indicates that the client device is either in close proximity to or touching the physical location. In an implementation of the method, determining an event may include determining that a transfer of data from the client device to the host computing device is to occur, the data being data displayed on the client device, and the transfer being to the active application on the host computing device.

In yet another implementation, a non-transitory computer readable medium may store computer executable instructions for context based interactions. The non-transitory computer readable medium may include instructions to detect, at a host computing device, a local signal from a client device, the local signal being associated with a physical location on a digitized surface of the host computing device. The non-transitory computer readable medium may include instructions to determine the physical location on the digitized surface based on the local signal. The non-transitory computer readable medium may include instructions to receive, at the host computing device, an identifier of the client device. The non-transitory computer readable medium may include instructions to determine an event based on at least an active application on the host computing device and the physical location. The non-transitory computer readable medium may include instructions to request a specific type of information related to the client device. The specific type of information may be selected by the host computing device based on the event.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these implementations will be readily apparent to those skilled in the art, and the generic principles defined herein may be applied to other implementations. Thus, the claims are not intended to be limited to the examples shown herein, but are to be accorded the full scope consistent with the language of the claims, wherein reference to an element in the singular is not intended to mean "one and only one" unless specifically so stated, but rather "one or more." In the subject disclosure, the word "exemplary" is used to mean serving as an example, instance, or illustration. Any implementation or design described herein as "exemplary" is not necessarily to be construed as preferred or advantageous over other implementations or designs. Rather, use of the word exemplary is intended to present concepts in a concrete fashion. Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computing device, comprising:
a digitized surface that detects a local signal from a client device in response to a touch event received on the digitized surface, the local signal being associated with a physical location on the digitized surface;
a memory; and
a processor communicatively coupled to the memory and the digitized surface, wherein the processor and memory are configured to:
determine the physical location on the digitized surface based on the local signal detected by the digitized surface of the computing device;
receive, at the computing device, an identifier of the client device;
determine, by the computing device, an event based on at least an active application on the computing device, and the physical location; and
request, by the computing device, a specific type of information related to the client device, wherein the specific type of information is selected by the computing device based on the event.

2. The computing device of claim 1, wherein the processor and the memory are configured to:
determine a device type of the client device based on the identifier, and
determine the event based on at least the active application, the physical location, and the device type.

3. The computing device of claim 1, wherein the processor and the memory are configured to:
receive metadata from the client device indicating a state of the client device; and
determine the event based on at least the active application, the physical location, and the state of the client device.

4. The computing device of claim 1, further comprising a display integrated with the digitized surface, wherein the processor and the memory are configured to:
determine, by the computing device, a device type of the client device based on the identifier,
determine, by the computing device, an area of the display associated with the active application and corresponding to the physical location;
determine, by the computing device, a function of the area associated with the active application; and
determine, by the computing device, the event based on at least the function and the device type.

5. The computing device of claim 1, further comprising a short range wireless communication interface, wherein the processor receives the identifier of the client device directly from the client device via the short range wireless communication interface.

6. The computing device of claim 5, wherein the processor and memory are configured to request the specific type of information related to the client device by transmitting a request for the information directly to the client device via the short range wireless communication interface.

7. The computing device of claim 5, further comprising a network interface different from the short range wireless communication interface, wherein the processor and memory are configured to request the specific type of information related to the client device by transmitting a request for the information to a service via the network interface, wherein the request includes a requested data type.

8. The computing device of claim 1, wherein the processor and memory are further configured to transmit information to the client device based on the event.

9. The computing device of claim 1, wherein the digitized surface is configured to detect the local signal from the client device when the client device is either in close proximity to or touching the physical location.

10. The computing device of claim 1, wherein determining an event comprises determining that a transfer of data from the client device to the computing device is to occur, the data being data displayed on the client device, and the transfer being to the active application on the computing device.

11. The computing device of claim 1, wherein the client device is a mobile phone, the physical location corresponds to a new tab button of a web browser application on the computing device, and the specific type of information is a website, wherein the processor and the memory are further configured to:
receive, from the client device, a uniform resource locator for a website displayed on the mobile phone; and
open a new tab in the web browser application for the website.

12. The computing device of claim 1, wherein the client device is a mobile phone or camera, the physical location corresponds to an input area of a document editor on the computing device, and the specific type of information is an image, wherein the processor and the memory are further configured to:
receive an image file corresponding to an image displayed on the mobile phone or camera; and
insert the image file into the input area.

13. A method for context based interactions by a host computing device, comprising:
detecting, at the host computing device, a local signal from a client device in response to a touch event received on the digitized surface, the local signal being associated with a physical location on a digitized surface of the host computing device;
determining the physical location on the digitized surface based on the local signal detected by the digitized surface of the computing device;
receiving, at the host computing device, an identifier of the client device;
determining, by the host computing device, an event based on at least an active application on the host computing device, and the physical location; and
requesting, by the host computing device, a specific type of information related to the client device, wherein the specific type of information is selected by the host computing device based on the event.

14. The method of claim 13, wherein determining the event based on at least the active application on the host computing device and the physical location comprises:
determining a device type of the client device based on the identifier, and
determining the event based on at least the active application, the physical location, and the device type.

15. The method of claim 13, wherein the digitized surface is integrated with a display of the host computing device, and wherein determining the event based on at least the active application on the host computing device and the physical location comprises:
determining, by the host computing device, a device type of the client device based on the identifier;

determining by the host computing device, an area of the display associated with the active application and corresponding to the physical location;

determining, by the host computing device, a function of the area associated with the active application; and determining by the host computing device, the event based on at least the function and the device type.

16. The method of claim 13, further comprising:

receiving metadata from the client device indicating a state of the client device; and determining the event based on at least the active application, the identifier, the physical location, and the state of the client device.

17. The method of claim 13, further comprising sending information to the client device based on the event.

18. The method of claim 13, wherein detecting the local signal from the client device comprises detecting a signal that indicates that the client device is either in close proximity to or touching the physical location.

19. The method of claim 13, wherein determining an event comprises determining that a transfer of data from the client device to the host computing device is to occur, the data being data displayed on the client device, and the transfer being to the active application on the host computing device.

20. A non-transitory computer readable medium storing computer executable instructions for a host computing device, comprising instructions to:

detect, at the host computing device, a local signal from a client device in response to a touch event received on the digitized surface, the local signal being associated with a physical location on a digitized surface of the host computing device;

determining the physical location on the digitized surface based on the local signal detected by the digitized surface of the host computing device:

receive, at the host computing device, an identifier of the client device;

determine, by the host computing device, an event based on an active application on the host computing device, the identifier, and the physical location; and request, by the host computing device, a specific type of information related to the client device, wherein the specific type of information is selected by the host computing device based on the event.

\* \* \* \* \*